US008423908B2

(12) United States Patent
Fux et al.

(10) Patent No.: US 8,423,908 B2
(45) Date of Patent: Apr. 16, 2013

(54) METHOD FOR IDENTIFYING LANGUAGE OF TEXT IN A HANDHELD ELECTRONIC DEVICE AND A HANDHELD ELECTRONIC DEVICE INCORPORATING THE SAME

(75) Inventors: Vadim Fux, Waterloo (CA); Sergey Kolomiets, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 471 days.

(21) Appl. No.: 11/469,507

(22) Filed: Sep. 8, 2006

(65) Prior Publication Data

US 2008/0065369 A1    Mar. 13, 2008

(51) Int. Cl.
*G06F 3/048* (2006.01)

(52) U.S. Cl.
USPC .............................. 715/816; 704/8

(58) Field of Classification Search .......... 704/8, 9, 704/1; 715/264, 816
See application file for complete search history.

(56) References Cited

U.S. PATENT DOCUMENTS

| 4,611,346 | A  | * | 9/1986 | Bednar et al. ............... 382/174 |
| 6,246,976 | B1 |   | 6/2001 | Mukaigawa et al. |
| 6,356,866 | B1 | * | 3/2002 | Pratley et al. ................ 704/9 |
| 7,027,975 | B1 | * | 4/2006 | Pazandak et al. ............. 704/9 |
| 2003/0074183 | A1 | * | 4/2003 | Eisele ........................ 704/1 |
| 2003/0078982 | A1 |   | 4/2003 | Ogawa |
| 2004/0004558 | A1 | * | 1/2004 | Fux ........................... 341/22 |
| 2004/0006455 | A1 | * | 1/2004 | Fux et al. .................... 704/4 |
| 2005/0138556 | A1 | * | 6/2005 | Brun et al. ................. 715/536 |
| 2005/0183036 | A1 | * | 8/2005 | Torii ........................ 715/825 |
| 2006/0025988 | A1 | * | 2/2006 | Xu et al. ..................... 704/8 |
| 2006/0047498 | A1 | * | 3/2006 | Fux et al. .................... 704/3 |
| 2006/0053001 | A1 | * | 3/2006 | Brockett et al. .............. 704/9 |
| 2006/0074628 | A1 | * | 4/2006 | Elbaz et al. .................. 704/8 |
| 2006/0247916 | A1 | * | 11/2006 | Fux et al. .................... 704/8 |
| 2006/0247917 | A1 | * | 11/2006 | Fux et al. .................... 704/9 |
| 2008/0114590 | A1 | * | 5/2008 | Scott ......................... 704/9 |

OTHER PUBLICATIONS

Office Action issued by the German Patent and Trademark Office, dated Jul. 13, 2010, for German Patent Application No. 11 2006 004 015.4-53, (3 pages).
Office Action from the German Patent and Trademark Office in Application 11 2006 004 015.4, dated Feb. 1, 2013, and English translation (14 pages).
Garay-Vitoria et al., "Text prediction systems: a survey," Springer-Verlag 2005 (16 pages).
Kikui, "Identifying the Coding System and Language of On-line Documents on the Internet," Proc. 16th Conf. Computational Linguistics, 1996, vol. 2, pp. 652-657.

* cited by examiner

*Primary Examiner* — Sara England
(74) *Attorney, Agent, or Firm* — Finnegan, Henderson, Farabow, Garrett & Dunner, LLP

(57) ABSTRACT

Incoming e-mails, instant messages, SMS, and MMS, are analyzed by a handheld electronic device to identify the language of text.

10 Claims, 4 Drawing Sheets

METHOD FOR IDENTIFYING LANGUAGE OF TEXT IN A HANDHELD ELECTRONIC DEVICE AND A HANDHELD ELECTRONIC DEVICE INCORPORATING THE SAME

BACKGROUND

1. Technical Field

Aspects of the disclosure relate to identifying language of text in a handheld electronic device.

2. Background Information

Generating text in a handheld electronic device examples of which include, for instance, personal data assistants (PDA's), handheld computers, two-way pagers, cellular telephones, text messaging devices, and the like, has become a complex process. This is due at least partially to the trend to make these handheld electronic devices smaller and lighter in weight. A limitation in making them smaller has been the physical size of the keypad if the keys are to be actuated directly by human fingers. Generally, there have been two approaches to solving this problem. One is to adapt the ten digit keypad indigenous to mobile phones for text input. This requires each key to support input of multiple characters. The second approach seeks to shrink the traditional full keypad, such as the QWERTY keyboard by doubling up characters to reduce the number of keys. In both cases, the input generated by actuation of a key representing multiple characters is ambiguous. Various schemes have been devised to disambiguate inputs from these multi-character keys.

A problem exists with regard to handheld electronic devices that have a full keypad or a reduced keypad in that the device cannot always accurately identify language of received text since a number of languages share the same encoding. As such, the potential exists for processing errors in the handheld electronic device in determining the identity of the language of the e-mail. If the handheld electronic device cannot accurately identify the language of the e-mail, the characters of the e-mail may be improperly displayed to the end-user or the handheld electronic device may add linguistic objects of the e-mail to the wrong list of commonly used linguistic objects that are used from the list for disambiguation.

DESCRIPTION

An aspect of the disclosed and claimed concepts is to identify the language of text and to verify the encoding of the text to minimize processing errors in a handheld electronic device. An exemplary external source of text is e-mail messaging.

Additional non-limiting examples include SMS (Short Message Service), MMS (Multi-Media Service) and instant messages.

More particularly, aspects of the disclosed and claimed concepts are directed to a method of identifying language of text in a handheld electronic device. The handheld electronic device has at least one application for receiving text from a source external to the handheld electronic device. The handheld electronic device also has available thereto a plurality of indicator lists with each indicator list comprising a number of linguistic objects which are indicative of a preselected language and which are in a different language from the linguistic objects of the other indicator lists. The general method of the disclosed and claimed concepts includes analyzing the text to at least preliminarily determine an encoding of the text, and comparing linguistic objects of the text to at least some of the linguistic objects of at least some of the indicator lists to identify the language of the text and to verify the encoding of the text.

Aspects of the disclosed and claimed concepts also embrace a handheld electronic device having a processing apparatus. The processing apparatus has a processor and a memory. Stored within the memory is at least one application for receiving text from a source external to the handheld electronic device. Stored within the memory also is a plurality of indicator lists with each indicator list comprising a number of linguistic objects which are indicative of a preselected language and which are in a different language from the linguistic objects of the other indicator lists. The memory has stored therein a number of routines which, when executed by the processor, cause the handheld electronic device to perform operations. The general nature of the operations can be stated as analyzing the text to at least preliminarily determine an encoding of the text, and comparing linguistic objects of the text to at least some of the linguistic objects of at least some of the indicator lists to identify the language of the text and to verify the encoding of the text.

Figure 1:
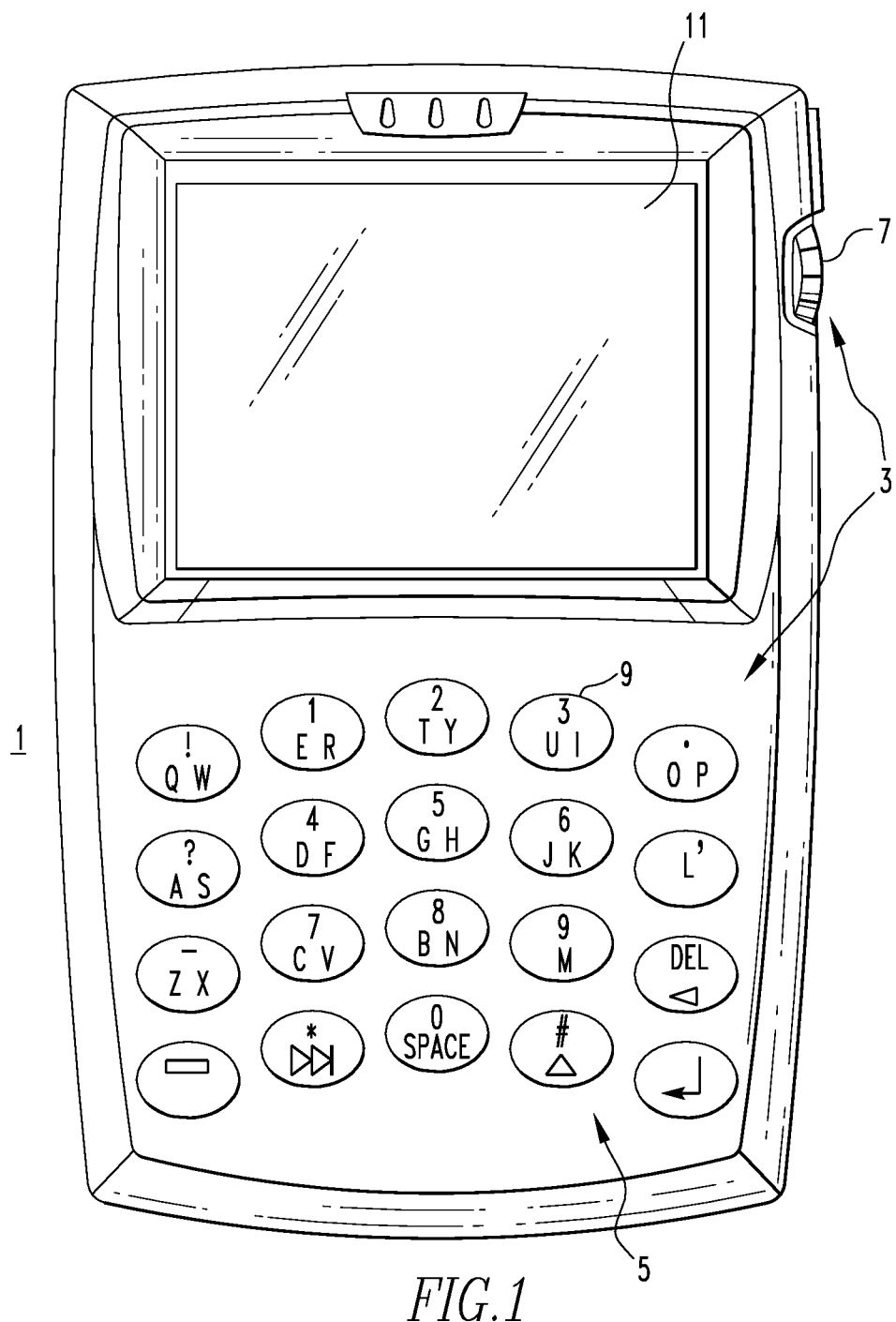
FIG. 1 is a front view of an exemplary handheld electronic device incorporating aspects of the disclosed and claimed concepts.

FIG. 1 illustrates a wireless handheld electronic device 1, which is but an example of a type of a handheld electronic device to which aspects of the disclosed and claimed concepts can be applied. The exemplary handheld electronic device 1 includes an input device 3 in the form of a keypad 5 and a thumbwheel 7 that are used to control the functions of the handheld electronic device 1 and to generate text and other inputs. The keypad 5 constitutes a reduced QWERTY keyboard in which most of the keys 9 are used to input two letters of the alphabet. It is noted, however, that the keypad 5 may be of other configurations, such as an AZERTY keyboard, a QWERTZ keyboard, or other keyboard arrangement, whether presently known or unknown, and either reduced or not reduced. Thus, initially the input generated by depressing one of these keys is ambiguous in that it is undetermined as to which letter was intended. Various schemes have been devised for disambiguating the inputs generated by these keys 9 assigned multiple letters for input. The input provided through the keypad 5 and thumbwheel 7 are displayed on a display 11 as is well known.

Figure 2:
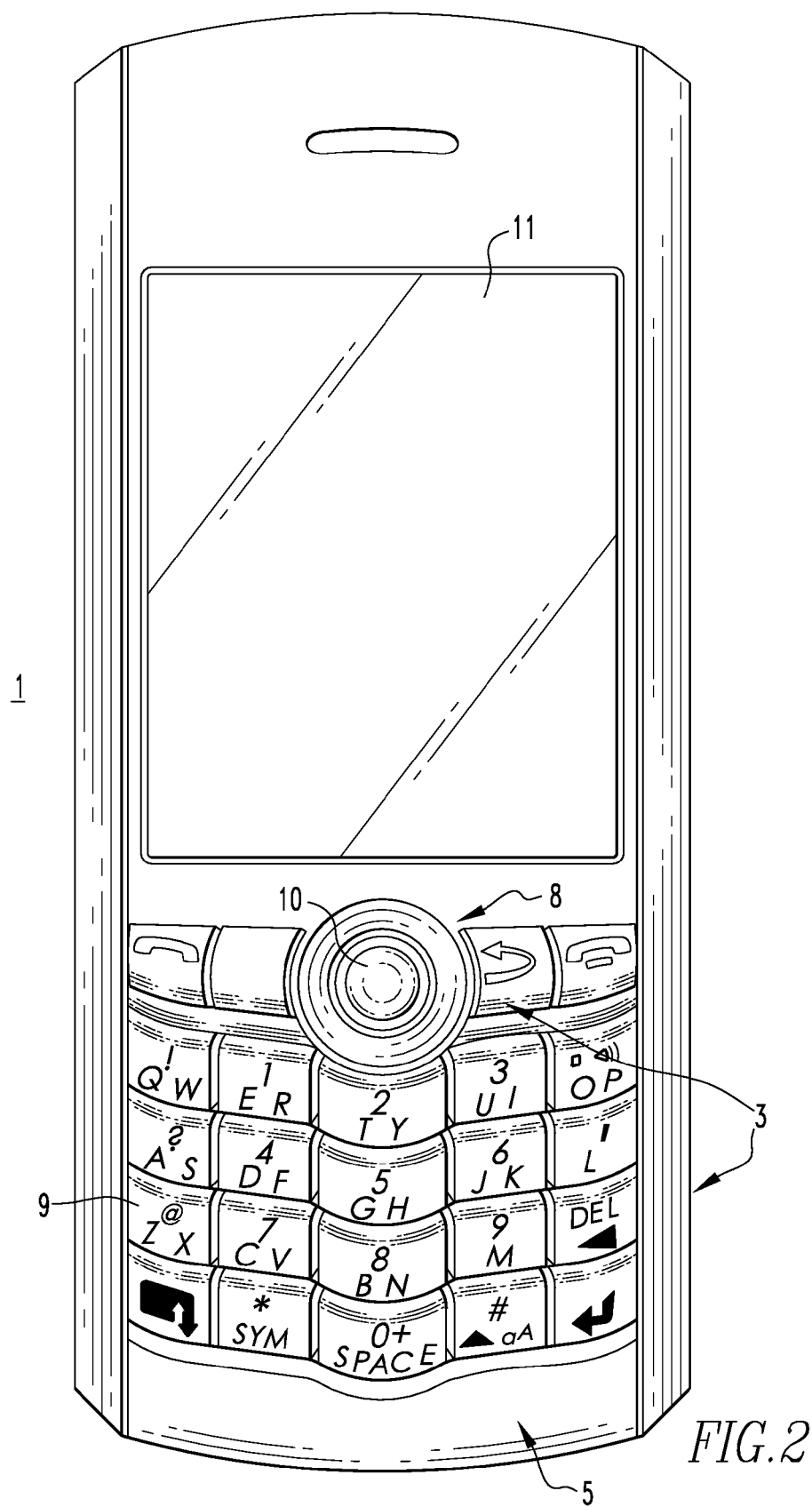
FIG. 2 is a front view of an alternate exemplary handheld electronic device incorporating aspects of the disclosed and claimed concepts.

FIG. 2 illustrates an alternate wireless handheld electronic device 1, which is but another example of a type of a handheld electronic device to which aspects of the disclosed and claimed concepts can be applied. Elements that are presented in FIG. 2 which are similar to the elements found in FIG. 1 are labeled with the same element number in FIG. 2. The exemplary handheld electronic device 1 includes an input device 3 in the form of a keypad 5 and a navigational tool 8 that is used to control the functions of the handheld electronic device 1 and to generate text and other inputs. The keypad 5 constitutes a reduced QWERTY keyboard in which most of the keys 9 are used to input two letters of the alphabet. It is noted, however, that the keypad 5 may be of other configurations, such as an AZERTY keyboard, a QWERTZ keyboard, or other keyboard arrangement, whether presently known or unknown, and either reduced or not reduced. Thus, initially the input generated by depressing one of these keys is ambiguous in that it is undetermined as to which letter was intended. Various schemes have been devised for disambiguating the inputs generated by these keys 9 assigned multiple letters for input. Continuing with FIG. 2, the handheld electronic device 1 also includes the navigational tool 8. In this particular embodiment, the navigational tool 8 is a trackball 10 that can be rotated thereby allowing for the navigation of a cursor which is displayed on a display 11 in various directions including up, down, left, right, and any combination thereof. Moreover, the trackball 10 can also be depressed. When the trackball 10 is depressed, a selection is made based upon the current location of the cursor. For example, if the cursor is located over a given program icon, that program will be launched when the trackball 10 is depressed. The input provided through the keypad 5 and trackball 10 is displayed on the display 11.

It should be noted, however, that despite FIG. 2 depicting the navigational tool 8 as being disposed on the front face of the handheld electronic device 1, the navigational tool 8 can also be disposed on a side of the handheld electronic device 1 in the form of the thumbwheel 7 as shown in FIG. 1. The thumbwheel 7 of FIG. 1, which is capable of being rotated and depressed, may be disposed on the side of the handheld electronic device 1 of FIG. 1 in lieu of the trackball 10. Rotation of the thumbwheel 7 can provide a navigation input, while depression of the thumbwheel 7 can provide a selection input. Accordingly, rotation of the thumbwheel 7 can navigate the cursor over a particular program icon, while depression of the thumbwheel 7 with the cursor located over a given program icon can launch the program.

Figure 3:
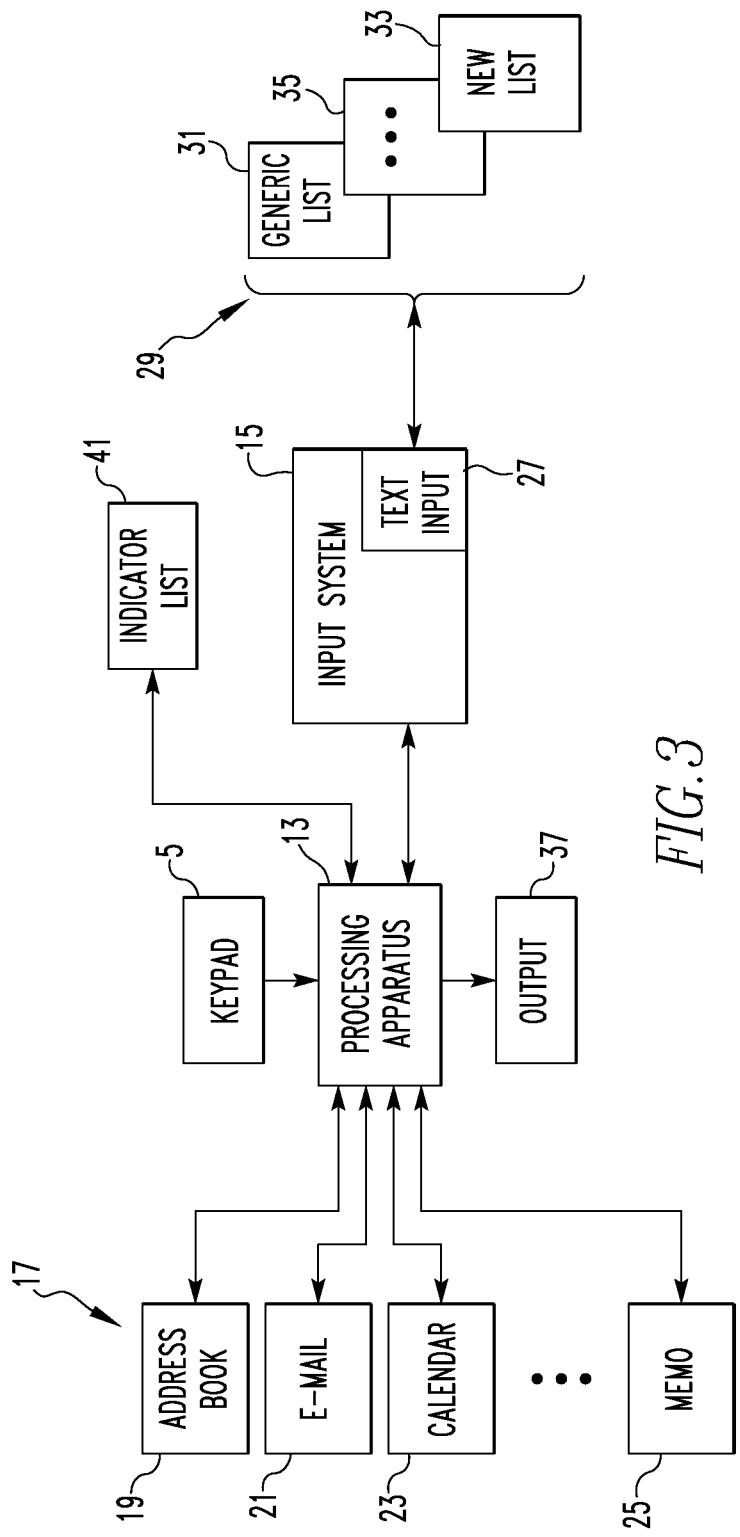
FIG. 3 is a functional diagram in block form illustrating aspects of the disclosed and claimed concepts.

Turning to FIG. 3, the input device 3 provides keystroke inputs to a processing apparatus 13 which may include, by way of example and not limitation, a memory, an operating system, a processor, a Java virtual machine, a run time environment or the like. The handheld electronic devices 1 of FIGS. 1-2 each implement a plurality of applications 17. These applications may include, by way of example and not limitation, an address book 19, e-mail 21, a calendar 23, a memo 25, and additional applications, such as, for example, spell check and a phone application. Generally these applications 17 require text input that is implemented by a text input process 27, which forms part of an input system 15.

Various types of text input processes 27 can be used that employ lists 29 to facilitate the generation of text. For example, in the exemplary handheld electronic device where the reduced QWERTY keyboard produces ambiguous inputs, the text input process 27 utilizes software to progressively narrow the possible combination of letters that could be intended by a specified sequence of keystrokes. Such "disambiguation" software is known. Typically, such systems employ a plurality of lists 29 of linguistic objects. By linguistic objects, it is meant words and in some languages ideograms. The keystrokes input linguistic elements, which in the case of words, are characters or letters in the alphabet, and in the case of ideograms, strokes that make up the ideogram. The lists 29 of language objects can also include abbreviations, and text shortcuts, which are becoming common with the growing use of various kinds of text messaging. Lists 29 that can be used by the exemplary disambiguation text input process 27 can include a generic list 31 and a new list 33. Additional lists 35 can include learned words and special word lists such as technical terms. Other types of text input processes 27 could include, by way of example and not limitation, prediction programs that anticipate a word intended by a user as it is typed in and thereby complete it, could also use word lists. Such a prediction program might be used with a full keypad.

Known disambiguation programs can assign frequencies of use to the linguistic objects, such as words or ideograms, in the lists 29 it uses to determine the linguistic object intended by the user. Frequencies of use can be initially assigned based on statistics of common usage and can then be modified through actual usage. It is known for disambiguation programs to incorporate "learned" linguistic objects such as words that were not in the initial lists 29, but were inserted by the user to drive the output 37 to the intended new word. It is known to assign such learned words an initial frequency of use that is near the high end of the range of frequencies of use. This initial frequency of use is then modified through actual use as with the initially inserted words.

One source for additional linguistic objects is by e-mail 21. Not only is it likely that new language objects contained in incoming e-mail 21 would be used by the user to generate a reply or other e-mail responses, such new linguistic objects could also be linguistic objects that the user might want to use in generating other text inputs.

A problem associated with using new linguistic objects received by e-mail 21 is that processing errors occur in the handheld electronic devices 1 of FIGS. 1-2 in identifying language of the text that is received. Typically, quantities of text in various languages are transmitted by e-mail with a preselected encoding which is then translated by the handheld electronic device 1 into the text that is shown on display 11 of the handheld electronic device 1. Encoding refers to the coding employed to transmit e-mail to the handheld electronic device 1. Encoding examples include, by way of example and not limitation, Unicode, ASCII and the like. Unfortunately, certain languages share the same encoding among characters, words or ideograms and the potential for processing errors exists in the handheld electronic device 1 in determining the identity of the language of the e-mail 21.

Figure 4:
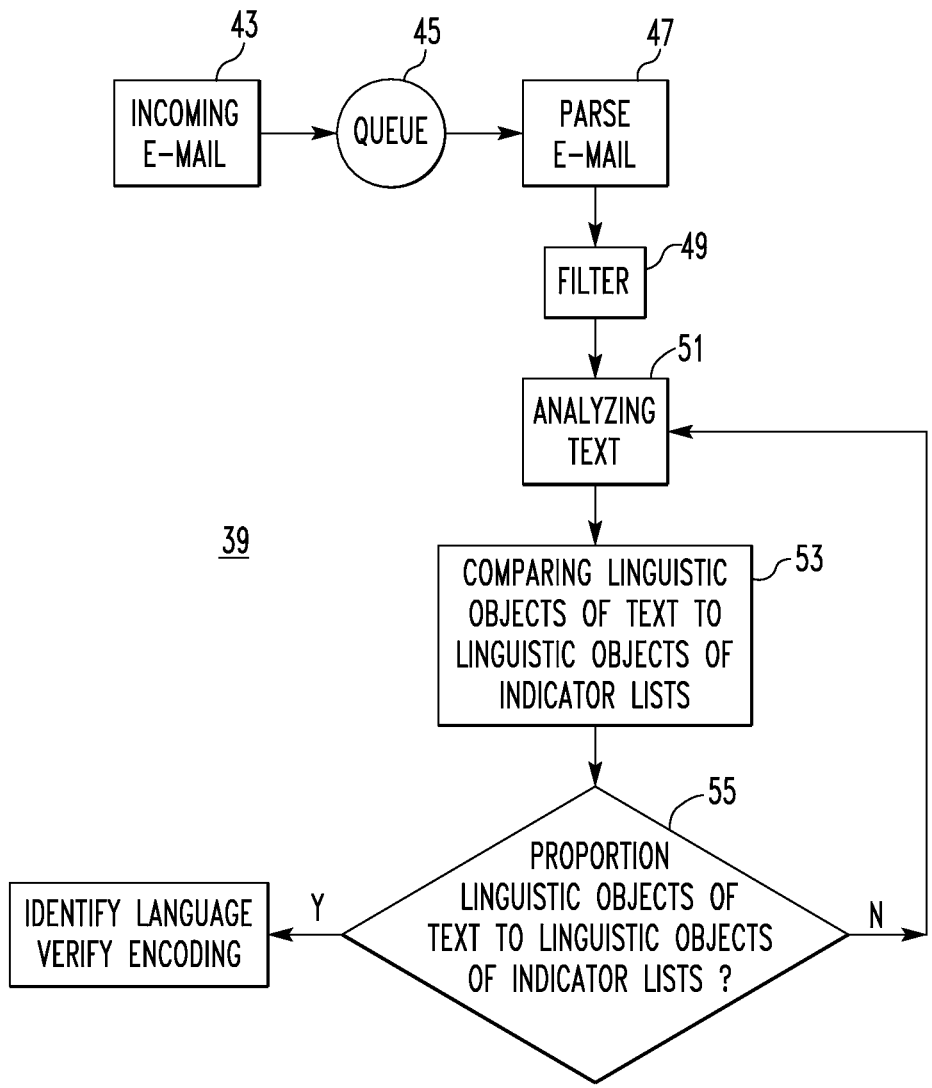
FIG. 4 is a flow chart illustrating operation of aspects of the disclosed and claimed concepts.

FIG. 4 illustrates a flow chart of a routine 39 for identifying language of text in the handheld electronic device 1. The processor apparatus 13 of the handheld electronic device 1 has a processor and a memory. Stored within the memory is at least one application for receiving text from a source external to the handheld electronic device 1. Stored within the memory also is a plurality of indicator lists 41 with each indicator list 41 comprising a number of linguistic objects which are indicative of a preselected language and which are in a different language from the linguistic objects of the other indicator lists 41. Each indicator list 41 may contain a set of most frequently found linguistic objects of the preselected language of the indicator list 41. For example, the indicator list 41 may have 20 or more linguistic objects stored within the memory. The linguistic objects may be, by way of example and not limitation, words or ideograms. Also, the different languages may consist of different dialects of a same language used in one or more countries.

The incoming e-mails 43 are placed in a queue 45 for processing as permitted by the processing burden on the handheld electronic device 1. Processing begins with scanning the e-mail to parse 47 the message into text. The parsed message is then filtered at 49 to remove unwanted components, such as numbers, dates, and the like. At least a portion of the message is then analyzed 51 for the frequency of use of characters in the text to at least preliminarily determine an encoding of the text. Encoding examples include, by way of example and not limitation, Unicode, ASCII and the like. The encoding of the text may dictate the language of the text but, in other circumstances, a plurality of languages will share the same encoding for various characters, words or ideograms which leads to processing problems in the handheld electronic device 1.

As such, in the routine 39, linguistic objects of the text are then compared 53 to at least some of the linguistic objects of indicator lists 41 to identify the language of the text and to verify the encoding of the text. In certain instances, the linguistic objects of the text may be compared 53 with at least some of the linguistic objects of all of the indicator lists 41. The handheld electronic device 1 then determines 55 if a proportion of the quantity of linguistic objects of the text that are also found in a given indicator list 41 to the total quantity of linguistic objects of text reaches a preselected threshold. If, for example, the linguistic objects of the text are also in a particular indicator list 41 at a proportion of 10% or more, the routine 39 determines 55 that the language of the text is the preselected language of a particular indicator list 41. The identification of a language would verify that the encoding of the text was correctly analyzed at 51. If, for example, the linguistic objects of the text are in a particular indicator list 41 at a proportion of less than 10%, the routine 39 determines that the language of the text has not yet been identified. If no language can be identified for the text, the routine 39 concludes that the encoding of the text has not been determined accurately so the linguistic objects of the text are routed to be analyzed 51 or compared 53 again.

Once the routine 39 determines that the language of the text is the preselected language of a particular indicator list 41, the routine 39 may end. Once the language has been determined properly, the linguistic objects of the text may be added to lists 29 that facilitate the generation of text in various disambiguation schemes. In certain circumstances, once the language has been determined properly, the linguistic objects of the text may be shown on display 11. For example, in certain languages, the encoding of certain letters or ideograms are the same. A user of the handheld electronic device 1 in Japan may not enjoy viewing Chinese characters appearing on display 11 because the processor did not have the ability to differentiate between the encoding of a Japanese and Chinese ideogram.

The above method identifies the language in a received e-mail. In addition to identifying the language of e-mails, other text received from sources outside the handheld electronic device 1 can also be scanned for new words. This can include identifying the language used in instant messages, SMS (short message service), MMS (multimedia service), and the like.

While specific embodiments of the disclosed and claimed concepts have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concepts which is to be given the full breadth of the claims appended and any and all equivalents thereof.

What is claimed is:

1. A method of identifying language of text in a handheld electronic device having at least one application for receiving text from a source external to the handheld electronic device and having available thereto a plurality of indicator lists with each indicator list comprising a number of linguistic objects which are indicative of a preselected language and which are in a different language from the linguistic objects of the other indicator lists, the method comprising:

analyzing received text for frequency of use of characters in the received text to at least preliminarily determine an encoding of the received text;

comparing linguistic objects of the received text to at least some of the linguistic objects of at least two of the indicator lists to determine if a proportion of the quantity of linguistic objects of the received text that are found in a particular indicator list reaches a preselected threshold;

upon determining that the preselected threshold has been reached, identifying a language of the received text;

verifying the correctness of the encoding when the preselected threshold is reached or exceeded; and adding new words of the received text to a word list associated with the language of the received text, to facilitate generation of text using disambiguation.

2. The method of claim 1, wherein said comparing comprises checking the linguistic objects of the received text with at least some of the linguistic objects of all of the indicator lists.

3. The method of claim 1, wherein the handheld electronic device has stored therein the plurality of indicator lists with each indicator list comprising linguistic objects that are indicative of the preselected language, and wherein the linguistic objects that are indicative of the preselected language comprise a set of most frequently found linguistic objects of the preselected language of the indicator list.

4. The method of claim 1, wherein the handheld electronic device has stored therein the plurality of indicator lists with each indicator list comprising linguistic objects that are indicative of the preselected language that are in a different language from the linguistic objects of the other indicator lists, and wherein the different language comprises a different dialect of a same language used in one or more countries.

5. The method of claim 1, further comprising displaying linguistic objects of the received text on a display of a handheld electronic device.

6. A handheld electronic device comprising a processing apparatus comprising a processor and a memory having stored therein at least one application for receiving text from a source external to the handheld electronic device and a plurality of indicator lists with each indicator list comprising a number of linguistic objects which are indicative of a preselected language and which are in a different language from the linguistic objects of the other indicator lists, the memory having stored therein a number of routines which, when executed by the processor, cause the handheld electronic device to perform operations comprising:

analyzing received text for frequency of use of characters in the received text to at least preliminarily determine an encoding of the received text;

comparing linguistic objects of the received text to at least some of the linguistic objects of at least some of the indicator lists to determine if a proportion of the quantity of linguistic objects of the received text that are found in a particular indicator list reaches a preselected threshold;

upon determining that the preselected threshold has been reached, identifying a language of the received text;

verifying the correctness of the encoding when the preselected threshold is reached or exceeded; and adding new words of the received text to a word list associated with language of the received text, to facilitate generation of text using disambiguation.

7. The handheld electronic device of claim 6, wherein said comparing comprises checking the linguistic objects of the received text with at least some of the linguistic objects of all of the indicator lists.

8. The handheld electronic device of claim 6, wherein the handheld electronic device has stored therein the plurality of indicator lists with each indicator list comprising linguistic objects that are indicative of the preselected language, and wherein the linguistic objects that are indicative of the preselected language comprise a set of most frequently found linguistic objects of the preselected language of the indicator list.

9. The handheld electronic device of claim 6, wherein the handheld electronic device has stored therein the plurality of indicator lists with each indicator list comprising linguistic objects that are indicative of the preselected language that are in a different language from the linguistic objects of the other indicator lists, and wherein the different language comprises a different dialect of a same language used in one or more countries.

10. The handheld electronic device of claim 6, further comprising displaying linguistic objects of the received text on a display of a handheld electronic device.

* * * * *

UNITED STATES PATENT AND TRADEMARK OFFICE
CERTIFICATE OF CORRECTION

PATENT NO. : 8,423,908 B2
APPLICATION NO. : 11/469507
DATED : April 16, 2013
INVENTOR(S) : Vadim Fux et al.

It is certified that error appears in the above-identified patent and that said Letters Patent is hereby corrected as shown below:

In the Claims

In claim 1, column 5, line 67, after "received text;" insert --processing the received text using the preliminarily determined encoding;--.

In claim 1, column 6, line 1, before "received text" insert --processed--.

In claim 1, column 6, line 4, before "received text" insert --processed--.

In claim 1, column 6, line 8, before "received text;" insert --processed--.

In claim 1, column 6, line 8, after "received text;" insert --and--.

In claim 1, column 6, lines 9-10, delete "verifying the correctness of the encoding when the preselected threshold is reached or exceeded; and".

In claim 1, column 6, line 11, before "received text" insert --processed--.

In claim 1, column 6, line 12, before "received text" insert --processed--.

In claim 2, column 6, line 15, before "received text" insert --processed--.

In claim 5, column 6, line 33, before "received text" insert --processed--.

In claim 6, column 6, line 48, after "received text;" insert --processing the received text using the preliminarily determined encoding;--.

In claim 6, column 6, line 49, before "received text" insert --processed--.

Signed and Sealed this
Twenty-fifth Day of June, 2013

Teresa Stanek Rea
*Acting Director of the United States Patent and Trademark Office*

CERTIFICATE OF CORRECTION (continued)
U.S. Pat. No. 8,423,908 B2

In claim 6, column 6, line 52, before "received text" insert --processed--.

In claim 6, column 6, line 56, before "received text;" insert --processed--.

In claim 6, column 6, line 56, after "received text;" insert --and--.

In claim 6, column 6, lines 57-58, delete "verifying the correctness of the encoding when the preselected threshold is reached or exceeded; and".

In claim 6, column 6, line 59, before "received text" insert --processed--.

In claim 6, column 6, line 64, before "received text" insert --processed--.

In claim 7, column 6, line 64, before "received text" insert --processed--.

In claim 10, column 7, line 16, before "received text" insert --processed--.